(12) United States Patent
Chao et al.

(10) Patent No.: US 8,451,764 B2
(45) Date of Patent: May 28, 2013

(54) METHOD AND APPARATUS FOR SUPPORTING MBMS IN SYSTEM ARCHITECTURE EVOLUTION

(75) Inventors: Hua Chao, PuDong Jinqiao (CN); Zhongji Hu, PuDong Jinqiao (CN); He Wang, PuDong Jinqiao (CN); Yonggang Wang, PuDong Jinqiao (CN)

(73) Assignee: Alcatel Lucent, Paris (FR)

( * ) Notice: Subject to any disclaimer, the term of this patent is extended or adjusted under 35 U.S.C. 154(b) by 709 days.

(21) Appl. No.: 12/531,744

(22) PCT Filed: Mar. 20, 2008

(86) PCT No.: PCT/CN2008/000555
§ 371 (c)(1),
(2), (4) Date: Sep. 17, 2009

(87) PCT Pub. No.: WO2008/113263
PCT Pub. Date: Sep. 25, 2008

(65) Prior Publication Data
US 2010/0110961 A1 May 6, 2010

(30) Foreign Application Priority Data

Mar. 21, 2007 (CN) .......................... 2007 1 0038490

(51) Int. Cl.
*H04H 20/71* (2008.01)
*H04W 4/14* (2009.01)
(52) U.S. Cl.
USPC ........... 370/312; 370/328; 370/329; 370/338; 455/422.1; 455/452.1; 455/466
(58) Field of Classification Search
None
See application file for complete search history.

(56) References Cited

U.S. PATENT DOCUMENTS
2007/0197235 A1   8/2007   Zhang

FOREIGN PATENT DOCUMENTS
| CN | 1581839 A | 2/2005 |
| CN | 1684414 A | 10/2005 |
| CN | 1917475 A | 2/2007 |
| JP | 2007-68011 A | 3/2007 |

OTHER PUBLICATIONS

Ericsson, "MBMS Reference Architecture Proposal," 3rd Generation Partnership Project (3GPP), 3GPP TSG RAN Joint SA2 / RAN2 / RAN3 Meeting, R3-070116, XP050020560, pp. 1-4, St. Louis, US, Feb. 13-14, 2007.

Panasonic, "eMBMS Logical Architecture," 3rd Generation Partnership Project (3GPP), 3GPP TSG RAN WG3 Meeting #55, R3-070193, XP050161122, pp. 1-3, St. Louis, Missouri, USA, Feb. 12-16, 2007.

(Continued)

*Primary Examiner* — Ian N Moore
*Assistant Examiner* — Brian T Le
(74) *Attorney, Agent, or Firm* — Fay Sharpe LLP

(57) ABSTRACT

The present invention discloses a system structure for supporting Evolved Multimedia Broadcast/Multicast Service (Evolved MBMS), comprising: a Broadcast/Multicast Service Center (BM-SC) for initiating control signaling and bearer services for Multimedia Broadcast/Multicast Service (MBMS); a System Architecture Evolved Gateway (SAE GW) for receiving MBMS service data and MBMS control signaling or service data from another network, and forwarding the received service data and control signaling; a Broadcast/Multicast Management Entity (BME) for receiving, processing and forwarding the MBMS control signaling, and determining, for each item of the service data for MBMS, an enhanced Node B (eNB) which needs to receive the control signaling; and an multicast User Plane Entity (mUPE) for receiving the MBMS service data, processing the received MBMS service data in Evolved Packet System Architecture Evolution, and forwarding the processed MBMS service data to a downstream node.

18 Claims, 2 Drawing Sheets

OTHER PUBLICATIONS

Vodafone, "Design of MBMS in LTE/SAE," 3$^{rd}$ Generation Partnership Project (3GPP), 3GPP TSG RAN WG2 Meeting #57, R3-070376, XP050020581, pp. 1-5, St. Louis, Missouri, USA, Feb. 12-16, 2007.

T-Mobile, "Proposed Way Forward; SAE Architecture Template," 3$^{rd}$ Generation Partnership Project (3GPP), 3GPP TSG SA WG2 Architecture—SAE ad hoc, S2-064251, XP050229740, pp. 1-7, Montreal, Canada, Nov. 14-16, 2006.

3GPP TSG RAN WG3# Tdoc R3-060652, "MBMS aspects in SAE/LTE work," (Nokia), Shanghai, China May 8-12, 2006.

3GPP TSG RAN WG3 #52, R3-060694, "Support of MBMS in E-UTRAN," Shanghai, China May 8-12, 2006.

European Search Report for EP08715008.2 dated May 10, 2011.

3GPP TSG RAN WG3# Tdoc R3-060652, MBMS aspects in SAE/LTE work (Nokia), May 12, 2006.

International Search Report.

METHOD AND APPARATUS FOR SUPPORTING MBMS IN SYSTEM ARCHITECTURE EVOLUTION

FIELD OF THE INVENTION

The present invention relates to an architecture system for supporting EMBMS (Evolved Multimedia Broadcast/Multicast Service) in a core network of wireless communication system, and in particular to a core network architecture for supporting EMBMS in System Architecture Evolution/Long-Term Evolution (SAE/LTE) of 3GPP (the Third Generation Partnership Project) and method of using this architecture system.

BACKGROUND OF THE INVENTION

The project of Long Term Evolution was started by 3GPP in 2005, aiming to provide supports for increasing demands of operators and subscribers with a higher data throughput and an improved network performance.

Multimedia Broadcast/Multicast Service (MBMS), introduced by 3GPP Rel6, is a point-to-point service for transmitting data from one data source to a plurality of subscribers so as to share network (including core network and access network) resources and provide services to a possibly largest number of multimedia subscribers having identical demands at the expense of resources as less as possible. In a radio access network, MBMS service uses a common transmission channel and a common radio bearer to implement both lower-rate message-type multicast and broadcast in pure text and higher-rate multicast and broadcast of multimedia services, such as mobile phone having television function.

FIG. 1 schematically shows an example of a mobile communication network as WCDMA system. As shown in FIG. 1, a plurality of NodeBs, such as NodeBs 11, 12 and 13, are connected to a NodeB controller, such as RNC (Radio Network Controller) 10 in the mobile communication network. A single RNC 10 manages several NodeBs. Each of the NodeBs is connected with RNC via a wired transmission, and the interface between them is defined as Iub interface. RNC 10 may also be connected to SGSN (Serving Gateway Support Node) of a System Architecture Evolution network (CN) via Iu interface.

FIG. 2 schematically shows a diagram of MBMS network structure in 3GPP Rel6 version. Network cells supporting MBMS includes BM-SC (Broadcast/Multicast Service Center), GGSN (GPRS Gateway Support Node), SGSN, access network (UTRAN) comprising NodeB and RNC, and UE (User Equipment). BM-SC is an entrance for content providers and adapted for authorization, initiating MBMS bearer service in PLMN (Public Landline Mobile Communication Network) and transmitting MBMS data in accordance with a predefined schedule. RNC performs allocation and control of radio resources on the MBMS bearer service and transmits MBMS service data to the NodeB, which is responsible for transmitting efficiently MBMS service data and control signaling via air interface.

Specification of SAE/LTE was defined by 3GPP since Rel7 version. In order to simplify network architecture and reduce delay, SAE/LTE cancels RNC as a network cell. The functions of RNC are distributed into NodeB (eNodeB) and core network. The current SAE/LTE-based network architecture is flatter than that before evolution. The portion of radio access network is reduced from the original structure of two network nodes (NodeB+RNC) to a structure of a single network (enhance NodeB, also simplified as eNB). MBMS is called EMBMS (Evolved MBMS) in the SAE/LTE-based network architecture.

The current version of Specification defines only an architecture supporting unicast service in terms of system architecture evolved networks. No proposal is given to an architecture supporting MBMS in system architecture evolved networks. There is a need for a system architecture evolved network entity for supporting MBMS in System Architecture Evolution.

SUMMARY OF THE INVENTION

An object of the invention is to provide a system structure and method for supporting EMBMS, which can support EMBMS in System Architecture Evolution and enable an efficient transmission of EMBMS control signaling and service data to eNBs.

To achieve the above object, in an aspect of the invention, the invention provides a system structure for supporting Evolved Multimedia Broadcast/Multicast Service (Evolved MBMS), comprising:

a Broadcast/Multicast Service Center (BM-SC) for initiating control signaling and bearer services for Multimedia Broadcast/Multicast Service (MBMS);

a System Architecture Evolved Gateway (SAE GW) for receiving MBMS service data and MBMS control signaling or service data from another network, and forwarding the received service data and control signaling;

a Broadcast/Multicast Management Entity (BME) for receiving, processing and forwarding the MBMS control signaling, and determining, for each item of the service data for MBMS, an enhanced Node B (eNB) which needs to receive the control signaling; and an multicast User Plane Entity (mUPE) for receiving the MBMS service data, processing the received MBMS service data in Evolved Packet System Architecture Evolution, and forwarding the processed MBMS service data to a downstream node.

In another aspect of the invention, the invention provides a method for supporting Multimedia Broadcast/Multicast Service (MBMS) in system architecture evolution, comprising the steps of:

initiating, by a Broadcast/Multicast Service Center (BM-SC), MBMS bearer services and forwarding the services to a System Architecture Evolved Gateway (SAE GW), or sending service data by another network to the SAE GW;

forwarding, by the SAE GW, the received MBMS service data or the service data from the another network to an multicast User Plane Entity (mUPE) after the SAE GW receives the MBMS service data or the service data from the another network;

performing, by the mUPE, a core-network processing on the received MBMS service data in Evolved Packet Core Network and forwarding the processed MBMS service data to a downstream node after the mUPE receives the MBMS service data.

In yet another aspect of the invention, the invention provides a method for transmitting Multimedia Broadcast/Multicast Service (MBMS) in system architecture evolution, comprising the steps of:

initiating, by a Broadcast/Multicast Service Center (BM-SC), an MBMS Session Start message and forwarding the MBMS Session Start message to a corresponding System Architecture Evolved Gateway (SAE GW);

forwarding, by the SAE GW, the received MBMS Session Start message to a corresponding Broadcast/Multicast Management Entity (BME) after the SAE GW receives the MBMS Session Start message;

sending, by the SAE GW, a response message back to the BM-SC in response to the reception of the MBMS Session Start message, so as to acknowledge the reception of the message;

receiving, by the BME, the MBMS Session Start message forwarded from the SAE GW, and forwarding the received MBMS Session Start message to each of enhance Node Bs (eNBs) which are connected to the BME and located in the service area covered by the MBMS;

sending, by the BME, a response message back to the SAE GW in response to the reception of the MBMS Session Start message, so as to acknowledge the reception of the message;

sending, by each of the eNBs, a response message back to the BME in response to the reception of the MBMS Session Start message, so as to acknowledge the reception of the message.

BRIEF DESCRIPTION OF THE DRAWINGS

The features and advantages of the invention can be more apparent from the following detailed descriptions with reference to the accompanying drawings in which.

DETAILED DESCRIPTION OF THE PREFERRED EMBODIMENTS

The preferred embodiments of the present invention will now be described more fully hereinafter with reference to the accompanying drawings. For the sake of simple, the detailed description of the known function and structure incorporated herein will be omitted, which would otherwise weaken the subject of the invention.

Figure 1:
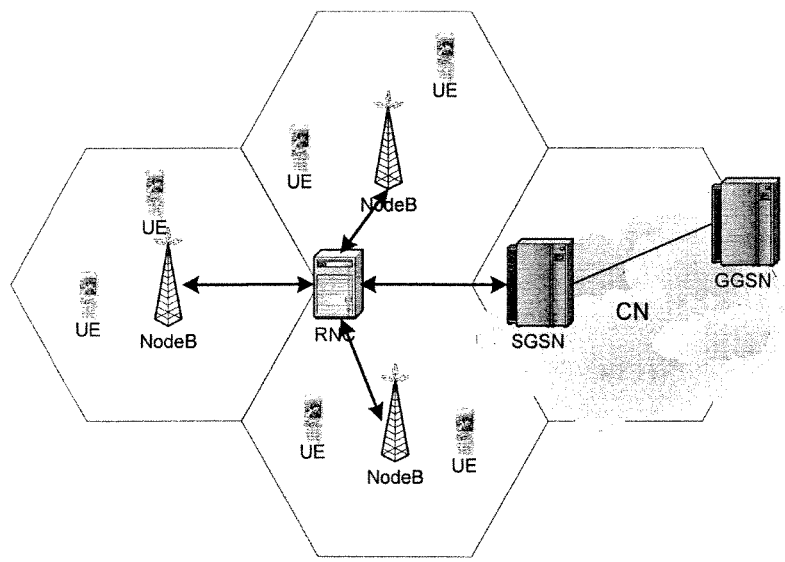
FIG. 1 is a schematic diagram showing a system structure of WCDMA radio access network.
Figure 2:
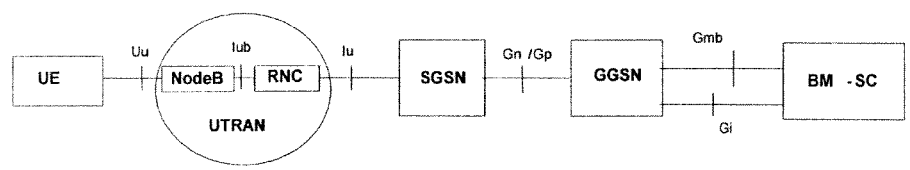
FIG. 2 is a schematic diagram showing a network topology structure for MBMS in Rel6 version.
Figure 3:
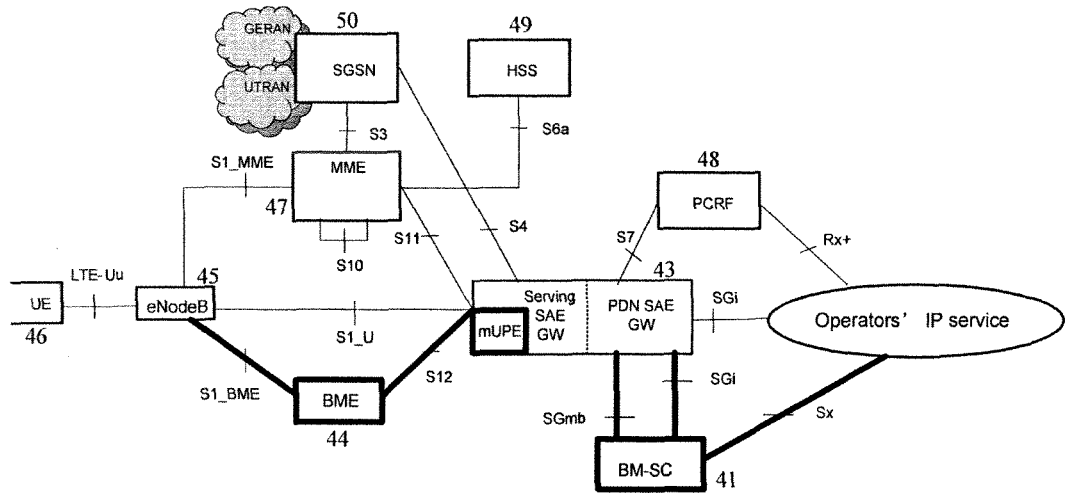
FIG. 3 is a schematic diagram of a MBMS-supporting System Architecture Evolution according to an embodiment of the present invention.

Now, reference is made to FIG. 3 which shows a schematic diagram of a MBMS-supporting system architecture in evolved packet System Architecture Evolution according to an embodiment of the present invention.

In FIG. 3, bold lines denote newly added function elements and interfaces, and thin lines denote existing function elements and interfaces in the conventional structure. The architecture has a mobile network as its center and thus can support mobility between fixed access and 3GPP.

The embodiment shown in FIG. 3 provides a structure supporting EMBMS in an evolved packet core network with separate user plane and control plane.

As shown in FIG. 3, the system architecture of the present embodiment comprises BM-SC 41, Serving SAE GW 42, PDN (Packet Data Network) SAE GW 43, BME 44, eNB 45, UE 46, MME (Mobility Management Entity) 47, PCRF (Policy and Charge Rule Function) 48, HSS (Home Subscriber Server) 49, SGSN (Serving Gateway Support Node) 50 and operators' IP service.

The present invention supports both a configuration where Serving SAE GW and PDN (Packet Data Network) SAE GW are located at the same physical node and a configuration where Serving SAE GW and PDN SAE GW are located at different physical nodes. In other words, Serving SAE GW and PDN SAE GW can be separated from each other. For the purpose of conciseness, the present invention is described by exemplifying the configuration where Serving SAE GW and PDN SAE GW are located at the same physical node.

In the present embodiment, BM-SC 41 is connected with SAE GW via logical interfaces SGmb and SGi. The logical interface SGmb can be an evolved interface as one of Gmb interfaces for Rel6 MBMS, and SGi can be an evolved interface as one of Gi interfaces for Rel6 core network. It should be noted that the present invention is not limited to this, and the logical interfaces SGmb and SGi can also be called "reference point" as defined in the conventional protocol. The logical interfaces SGmb and SGi are reference points for user plane and control plane, respectively. 3GPP network is connected with PDN via the reference point SGi, which corresponds to the reference points Gi and Wi and incorporates their functions, as compared to networks in versions before SAE/LET. The reference point Gi supports 3GPP network access PDN, and the reference point Wi supports non-3GPP network access PDN. Further, the interface SGmb corresponds to the old interface Gmb before SAE/LET, and the two interfaces are a reference point dedicated to EMBMS service. Because evolution of network reduces control signaling in the core network, the interface SGmb may not support certain signaling such as subscription and authentication of users, as compared to the interface Gmb.

Logical interface Sx connecting BM-SC 41 with operator IP service is adapted to support, for example, IMS (IP Multimedia System) subscriber service through MBMS bearer service. BME 44 is connected with Serving SAE GW 42 via logical interface S12, and is further connected with eNB 45 via logical interface S1_BME.

The separate logical function entities for MBMS in the present invention are different from those for unicast service in which MME is for control plane and UPE (User Plane Entity) is for user plane. In the present embodiment, separate logical function entities are adopted. That is, EMBMS BME is responsible for control plane functions related to EMBMS, and mUPE (multicast UPE) is responsible for user plane functions related to EMBMS.

Further referring to FIG. 3, Serving SAE GW 42 can be connected to eNB 45 via interface S1_U, and also be connected with MME 47 and SGSN 50 via interfaces S11, S4, respectively. PDN SAE GW 43 can be connected with operator IP service via SGi, and also be connected with PCRF 48 via interface S7. PCRF 48 can be connected with operator IP service via interface Rx. eNB 45 can be connected with MME 47 via logical interface S1_MME, and MIME 47 can be connected with SGSN 50 and HSS 49 via interfaces S3, S6a, respectively. UE 46 can be connected with eNB via LTE_Uu, and GERAN network and UTRAN network can be connected with SGSN via interfaces Gb and Iu, respectively.

BM-SC 41 has functions identical to those of BM-SC in 3GPP Rel6. BM-SC 41 serves as an entrance for content providers, initiates EMBMS bearer service and MBMS Session Start message, and transmits MBMS service data in a predefined schedule. BM-SC 41, as the beginning point of service provision to mobile terminals, transmits EMBMS service content in a broadcast or multicast protocol. SAE GW and BM-SC 41 exchange signaling via the logical interfaces SGmb and SGi. It should be noted that BM-SC 41 can also transmit messages and data in any other appropriate protocol. BM-SC 41 should also guarantee network security.

PDN SAE GW 43 receives MBMS service data and control signaling from BM-SC 41 or service data and control signaling from other network device, and stores service parameters locally. PDN SAE GW 43 forwards the received service data to Serving SAE GW 42, which receives the MBMS service data and control signaling, subsequently performs a core network processing on the data and sends the processed service data to a downstream node. SAE GW also has a function of EMBMS distribution tree management. When there are a plurality of eNBs and a plurality of gateways in a network, subscriber data is passed downwards in a tree-shape structure. In this case, SAE GW, cooperating with eNB 45, selects a specific route for passing subscriber data downwards in a tree-shape structure.

PDN SAE GW also receives MBMS service data and control signaling from BW-SC or other network, stores service parameters locally and forwards the received service data and control signaling to Serving SAE GW.

BME44 receives, processes and forwards control signaling for MBMS such as MBMS Session Start message sent from BM-SC, and other control signaling, such as MBMS Session Update/Stop messages, and determines which eNBs need to receive these messages, with respect to each item of the MBMS service. BME 44 also stores context for MBMS service, and stores a mapping relationship from service area to eNBs, with respect to each item of the MBMS service. BME 44 further has a function of EMBMS distribution tree management.

It should be noted that BME 44 can be embodied as an individual network cell or can be provided in MCE or MME.

BME 44 can be an individual network as a control plane boundary cell of access network and core network in EMBMS architecture. Further, BMC 44 can be placed within MME if the future network evolution supports enhanced MME, that is, MME can support not only the currently defined unicast service but also EMBMS service. For operation of Single Frequency Network (SFN), a Multi-Cell/Multicast Coordination Entity (MCE) is specifically defined by 3GPP to address the problem of radio resource allocation for EMBMS. Also, BME 44 can be placed within MME if the future network evolution enhances the functions of MCE, that is, MCE can not only handle control plane processing for SFN operation on EMBMS service, but also support processing of EMBMS control signaling (e.g., MBMS Session Start) on the interface S1, setup and release of MBMS bearer, and other necessary control plane functions.

The number of BME depends on operator's configuration in Evolved Packet Core. SAE network is flatter than Rel6 network, and a single SAE GW can be connected with thousands of eNBs. If each SAE GW has only one BME, it is necessary to duplicate the received MBMS Session Start message for thousands of times and to transmit the duplicated MBMS Session Start messages to respective eNBs. In this case, BME suffers from heavy workload, and it is worse when several MBMS Session Start messages are ongoing at the same time. To avoid the potential problem with transmission of MBMS Session Start message, a plurality of BMEs 44 can be provided in the coverage of a single SAE GW. As an example, for broadcast service, one BME can be provided per maximum SFN area according to operator's static deployment.

mUPE in Serving SAE GW 42 receives MBMS service data sent from BM-SC 41 and processes the data in Evolved Packet SAE. mUPE also allocates the received MBMS service data to downstream nodes. For each Serving SAE GW, only one mUPE is provided per item of MBMS service.

In a situation of mobile terminal roaming, MME/UPE acts as mobile entity in access network, while PDN SAE GW acts as a function entity in network. An efficient mapping is required between MME/UPE and PDN SAE GW to implement Fixed Mobile Combination (FMC) control.

Figure 4:
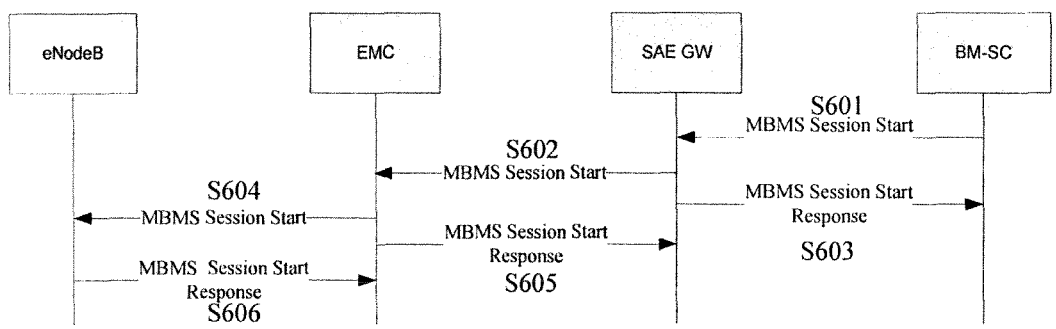
FIG. 4 is a flowchart showing a process of transmitting service data in the MBMS-supporting System Architecture Evolution according to an embodiment of the present invention.

FIG. 4 is a flowchart showing a process of transmitting service data in the MBMS-supporting System Architecture Evolution according to the embodiment of the present invention.

Referring to FIG. 4, a process of transmitting MBMS service data in System Architecture Evolution is described by taking transmission of MBMS Session Start message as example. At step S601, BM-SC 41 first initiates MBMS Session Start message and transmits it to a corresponding SAE GW. The MBMS Session Start message carries attributes and parameters about the message such as ID, QoS, service area for a service. At step S602, SAE GW, after receiving MBMS Session Start message, stores locally the parameters contained in the message, and forwards MBMS Session Start message to a corresponding EMC 44. At step S603, SAE GW sends a response message back to BM-SC to acknowledge reception of MBMS Session Start message.

At step S604, BME 44 receives MBMS Session Start message forwarded from SAE GW, stores parameters contained in the message, and forwards the received MBMS Session Start message to each of eNBs which are connected to BME 44 and located within MBMS service area. Then, at step S605, BME 44 sends a response message back to SAE GW to acknowledge reception of MBMS Session Start message. According to the present invention, BME 44 can sends the response message back to SAE GW before it receives from any involved eNB a response for reception of MBMS Session Start message at the eNB. It should be noted, in the present invention, no compulsive time limit is imposed on the transmission of the response message from BME to SAE GW. BME 44 can also send the response message to SAE GW after it receives a response message from eNBs. Finally, at step S606, each of the eNBs sends a response message to BME to acknowledge reception of MBMS Session Start message at the eNB.

Although the foregoing description is given by taking as example a process of BME starting MBMS Session, BME can also handle other control plane signaling such as MBMS Session Update or Stop.

In the foregoing description, means for implementing respective logical functions are called "entities". It should be noted that the term "entity" covers cells, means and devices having respective logical functions as well as any other term having similar meaning. The above-mentioned functions can be realized in hardware, while the present invention is not limited to this. These functions can also be implemented in software executed in a computer.

The present invention provides a system structure for supporting MBMS service data in 3GPP SAE and a method for applying the system structure to transmission of MBMS control signaling and service data so that they can arrive eNBs in an efficient way.

While exemplary embodiments of the present invention have been described hereinabove, it should be clear to those skilled in the art that any variations and/or modifications of the basic inventive concepts will still fall within the scope of the present invention, as defined in the appended claims.

What is claimed is:

1. A system structure for supporting Evolved Multimedia Broadcast/Multicast Service (Evolved MBMS), comprising:
 a Broadcast/Multicast Service Center (BM-SC) for initiating control signaling and bearer services for Multimedia Broadcast/Multicast Service (MBMS), said BM-SC being operative to transmit service data and control signaling to a System Architecture Evolved Gateway (SAE GW);

a System Architecture Evolved Gateway (SAE GW), said SAE GW being operative to receive MBMS service data and MBMS control signaling from said BM-SC, if available therefrom and to receive MBMS service data and MBMS control signaling from another network, if available therefrom, and to forward said received MBMS service data and MBMS control signaling, said SAE GW being further operative to forward said received MBMS service data and MBMS control signaling to a Broadcast/Multicast Management Entity (BME);

a Broadcast/Multicast Management Entity (BME) for receiving, processing and forwarding the MBMS control signaling, and determining, for each item of said MBMS service data, an enhanced Node B (eNB) which needs to receive said MBMS control signaling, said BME being operative to forward said MBMS control signaling to the determined eNB; and a multicast User Plane Entity (mUPE) for receiving the MBMS service data, processing the received MBMS service data according to the Evolved Packet System Architecture Evolution, and forwarding the processed MBMS service data to a downstream node, said mUPE being configured to receive MBMS service data sent from said BM-SC, wherein the SAE GW comprises:

a Packet Data Network SAE GW for receiving the MBMS service data and the MBMS control signaling from the BM-SC or another network, storing locally service parameters and forwarding the received MBMS service data and MBMS control signaling to a Serving SAE GW;

the Serving SAE GW for receiving the MBMS service data and the MBMS control signaling from the Packet Data Network SAE GW, storing locally service parameters and forwarding the received MBMS service data and MBMS control signaling to the downstream node and wherein the Serving SAE GW has a function of distribution tree management on the MBMS to be forwarded.

2. The system structure of claim 1, wherein the Serving SAE GW and the Packet Data Network SAE GW are located at one same physical node.

3. The system structure of claim 1, wherein the Serving SAE GW and the Packet Data Network SAE GW are located at different physical nodes.

4. The system structure of claim 1, wherein the Serving SAE GW stores locally parameters contained in the forwarded MBMS control signaling.

5. The system structure of claim 1, wherein the BME stores parameters contained in the forwarded MBMS control signaling.

6. A system structure for supporting Evolved Multimedia Broadcast/Multicast Service (Evolved MBMS), comprising:

a Broadcast/Multicast Service Center (BM-SC) for initiating control signaling and bearer services for Multimedia Broadcast/Multicast Service (MBMS), said BM-SC being operative to transmit service data and control signaling to a System Architecture Evolved Gateway (SAE GW);

a System Architecture Evolved Gateway (SAE GW), said SAE GW being operative to receive MBMS service data and MBMS control signaling from said BM-SC, if available therefrom and to receive MBMS service data and MBMS control signaling from another network, if available therefrom, and to forward said received MBMS service data and MBMS control signaling, said SAE GW being further operative to forward said received MBMS service data and MBMS control signaling to a Broadcast/Multicast Management Entity (BME);

a Broadcast/Multicast Management Entity (BME) for receiving, processing and forwarding the MBMS control signaling, and determining, for each item of said MBMS service data, an enhanced Node B (eNB) which needs to receive said MBMS control signaling, said BME being operative to forward said MBMS control signaling to the determined eNB; and a multicast User Plane Entity (mUPE) for receiving the MBMS service data, processing the received MBMS service data according to the Evolved Packet System Architecture Evolution, and forwarding the processed MBMS service data to a downstream node, said mUPE being configured to receive MBMS service data sent from said BM-SC;

wherein the BME has a function of distribution tree management on the MBMS to be forwarded.

7. The system structure of claim 6, wherein the BME can be implemented as an individual network entity, or can be provided in a Multicast Coordination Entity (MCE) or a Mobility Management Entity (MME).

8. The system structure of claim 6, wherein the BME is connected to the Serving SAE GW and a node (eNB) via interfaces, respectively.

9. The system structure of claim 6, wherein the MBMS is Evolved MBMS.

10. A method for supporting Multimedia Broadcast/Multicast Service (MBMS) in system architecture evolution, comprising:

initiating, by a Broadcast/Multicast Service Center (BM-SC), MBMS bearer services and forwarding, by the BM-SC, content of said MBMS bearer services to a System Architecture Evolved Gateway (SAE GW), or sending service data by another network to the SAE GW;

receiving, by the SAE GW, the MBMS service data and the MBMS control signaling from the BM-SC or another network, storing locally service parameters and forwarding the received MBMS service data and MBMS control signaling to a Serving SAE GW;

forwarding, by the SAE GW, to a Serving SAE GW, the received MBMS service data or the service data from the another network to an multicast User Plane Entity (mUPE) after the SAE GW receives the MBMS service data or the service data from another network;

receiving, by the Serving SAE GW, the MBMS service data and the MBMS control signaling from the SAE GW;

storing locally, by the Serving SAE GW service parameters and forwarding the received MBMS service data and MBMS control signaling to the downstream node;

performing, by the Serving SAE GW, distribution tree management on the MBMS to be forwarded; and performing, by the mUPE, a core-network processing on the received MBMS service data in Evolved Packet Core Network and forwarding the processed MBMS service data to a downstream node after the mUPE receives the MBMS service data.

11. The method of claim 10, further comprising performing, by the SAE GW, distribution tree management on the MBMS to be forwarded.

12. The method of claim 10, further comprising performing, by a Broadcast/Multicast Management Entity (BME), distribution tree management on the MBMS to be forwarded.

13. The method of claim 10, wherein the MBMS is Evolved MBMS.

14. The method of claim 10 comprising:
initiating, by the Broadcast/Multicast Service Center (BM-SC), an MBMS Session Start message and forwarding the MBMS Session Start message to the System Architecture Evolved Gateway (SAE GW);
forwarding, by the SAE GW, the received MBMS Session Start message to a Broadcast/Multicast Management Entity (BME) after the SAE GW receives the MBMS Session Start message;
sending, by the SAE GW, a response message back to the BM-SC in response to the reception of the MBMS Session Start message, so as to acknowledge the reception of the MBMS Session Start message;
receiving, by the BME, the MBMS Session Start message forwarded from the SAE GW, and forwarding the received MBMS Session Start message to each of enhance Node Bs (eNBs) which are connected to the BME and located in a service area covered by the MBMS;
sending, by the BME, a response message back to the SAE GW in response to the reception of the MBMS Session Start message so as to acknowledge the reception of the MBMS Session Start message;
sending, by each of the eNBs, a response message back to the BME in response to the reception of the MBMS Session Start message so as to acknowledge the reception of the MBMS Session Start message.

15. The method of claim 14, further comprising storing locally parameters contained in the MBMS Session Start message by the SAE GW.

16. The method of claim 14, further comprising storing locally parameters contained in the MBMS Session Start message by the BME.

17. The method of claim 14, wherein the BME is able to update and stop an MBMS Session.

18. The system structure of claim 6, wherein the BME is a management entity for Evolved MBMS.

* * * * *